Nov. 25, 1952  H. T. SPARROW  2,619,342
OVERSPEED CONTROL APPARATUS
Filed June 6, 1946  3 Sheets-Sheet 3

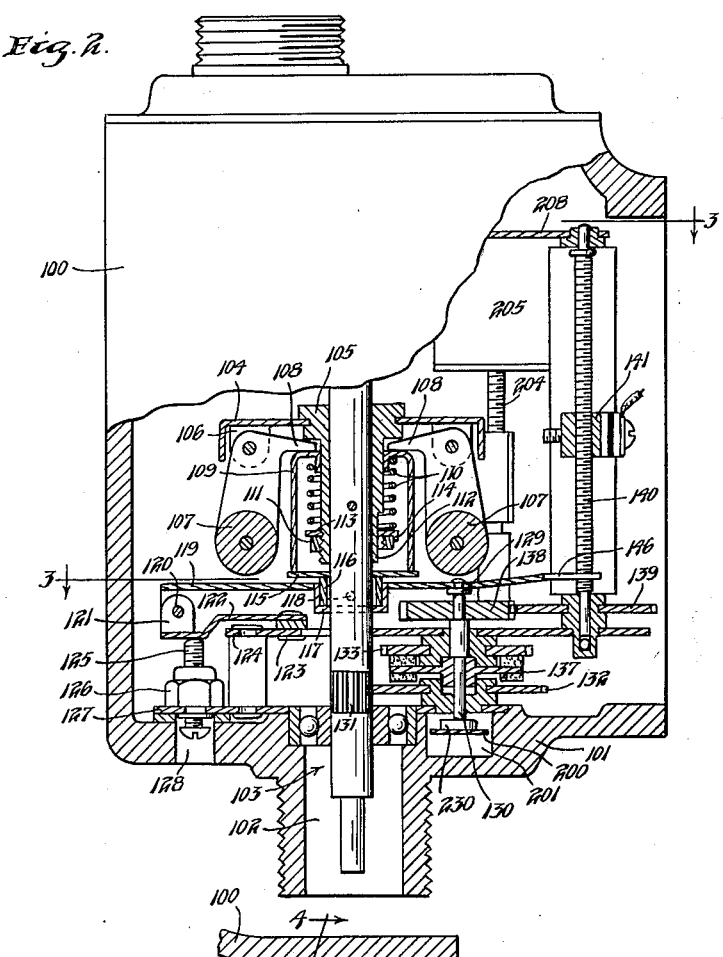

INVENTOR
HUBERT T. SPARROW
BY George H. Fisher
ATTORNEY

Patented Nov. 25, 1952

2,619,342

UNITED STATES PATENT OFFICE 2,619,342

OVERSPEED CONTROL APPARATUS

Hubert T. Sparrow, Minneapolis, Minn., assignor to Minneapolis-Honeywell Regulator Company, Minneapolis, Minn., a corporation of Delaware Application June 6, 1946, Serial No. 674,747

5 Claims. (Cl. 264—8)

This invention relates to apparatus for controlling the speed of a variable speed device and has particular reference to means for selectively setting the maximum operating speed of the compressor supplying air for combustion to the induction system of an internal combustion engine.

Internal combustion engines, and particularly those used on aircraft, are now commonly provided with a compressor driven by a turbine powered by exhaust gases from the engine. This combination is called a turbo-supercharger and is used for supplying air at much greater than atmospheric pressure to the engine. The speed of the compressor, and hence the pressure of the air supplied to the engine, is controlled by a damper-like valve, called a waste gate, which by-passes more or less of the exhaust gases from the engine to atmosphere.

The waste gate is automatically positioned to maintain a selected air pressure at the engine under widely varying atmospheric conditions by an electronic control system of which one example is shown and claimed in the Daniel G. Taylor Patent No. 2,388,350, issued November 6, 1945, and which I herein illustrate and describe in as much detail as necessary to the understanding of my present invention.

Embodied in the control system is an overspeed control which sets a normal maximum speed range for the compressor for safety purposes. This control acts to override the normal manifold pressure control. Whenever the compressor is rotating at its top rated speed, the overspeed control readjusts the pressure control point sufficiently that the compressor speed is just below the top rated speed. The manifold pressure maintained under these conditions will of course vary with altitude. Frequently it is desirable to override this control so that for a limited time a greater speed may be attained, thus securing added or "war" power from the engine. It is the primary object of my invention to provide a manually and remotely controllable means for thus overriding the overspeed control when such action is desirable.

Another object is to provide, in connection with a speed controlling means embodying a speed responsive governor, a solenoid actuated means for increasing the spring loading of the governor so that the speed range at which it becomes effective may be raised for desired periods of time.

An overspeed control unit of the nature to which my invention is applicable is now in wide use and embodies a spring which is effective to set a normal maximum speed range at which the governor becomes effective to initiate a speed reduction, and it is another object of this invention to provide means readily applied to this control unit and operative upon said spring to increase the force thereof resisting the governor. Thus the speed range at which the governor exerts its controlling function is readily raised when required.

These and other more detailed and specific objects will be disclosed in the course of the following specification, reference being had to the accompanying drawings, in which Figure 1 is a diagrammatical showing of a complete engine induction and exhaust system, the electronic control system for the intake manifold pressure and illustrating my selective overspeed control associated with the control system.

Figure 2 is a cross sectional view, partially in elevation, of an overspeed control to which my invention is applied.

Figure 3 is a horizontal cross section along the line 3—3 through the case of the unit of Figure 2 and illustrating certain of the parts therein in plan view and others in horizontal section, with portions of the parts broken away.

Figure 1

Figure 1:
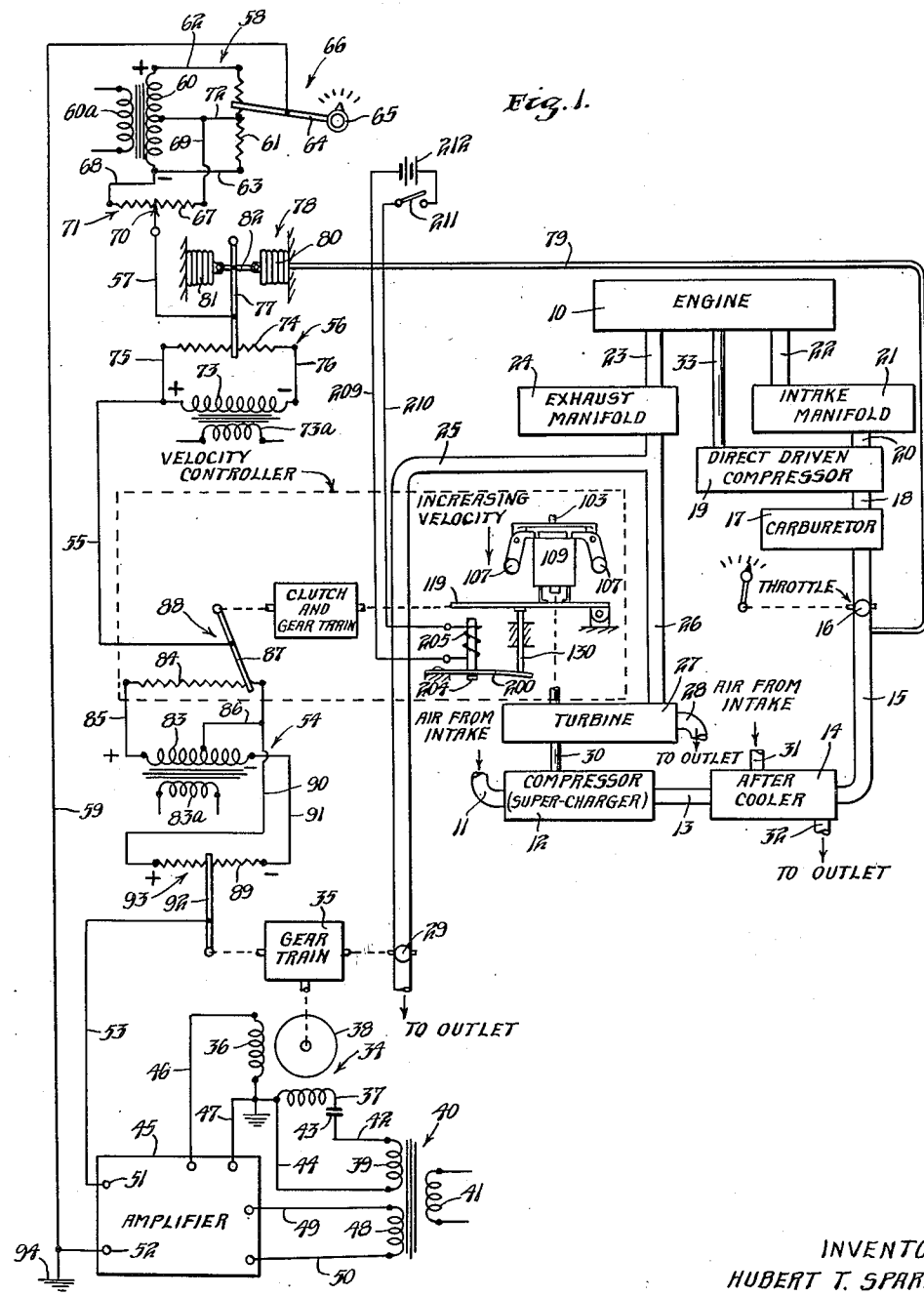

Referring now more particularly to Figure 1, I show therein an engine 10 which may be the engine of an aircraft, and which is of the internal combustion type. Air for supporting combustion in the engine passes from an intake 11 through a compressor 12, a conduit 13, an aftercooler 14, a conduit 15 wherein a throttle 16 is arranged, a carburetor 17, a conduit 18, a direct driven compressor 19, a conduit 20, and into an intake manifold 21 shown as connected to the engine by conduit 22.

The exhaust gases from the engine flow through a conduit 23 into an exhaust manifold 24 and issue therefrom through an exhaust conduit 25, commonly called the exhaust stack, and having a branch 26 leading to a turbine 27. The turbine is provided with an outlet 28 through which the exhaust gases may pass to atmosphere after actuating the rotor of the turbine. Arranged in the exhaust conduit is a damper-like valve 29 commonly termed a waste gate and which regulates the flow of gases to the atmosphere through that conduit.

The compressor 12 is driven from the turbine 27 by a shaft 30 and this combination of units is commonly termed the turbo-supercharger. The air compressed by the compressor 12 passes through the aftercooler 14 where the heat of compression is at least partially removed by passing air (by means not shown) from an intake 31 in heat-exchanging relation with the compressed air after which the heated air is delivered at an outlet 32.

As clearly shown, the throttle 16 may be hand positioned by a suitable control, and in the carburetor 17 fuel from a supply (not here shown) is mixed with the air to provide a combustible gas.

The compressor 19 is direct driven from the engine 10 by a shaft 33 and operates not only to provide added compression, but also to evenly distribute the combustible gas to the intake manifold 21.

The waste gate 29 is positioned by a motor 34 through a gear train 35. This motor is of the split-phase type, being provided with a pair of field windings 36 and 37 which are spaced ninety electrical degrees apart, and which windings cooperate with an armature 38. The motor field winding 37 is supplied with electrical energy by a secondary winding 39 of a transformer 40, having a primary winding 41 which is connected to a suitable source of alternating current (not here shown). The energizing circuit for the field winding 37 may be traced from the upper terminal of the secondary winding 39 through a conductor 42, a condenser 43, the field winding itself, and through a conductor 44 back to the lower terminal of said secondary winding.

The energization of the other field winding of the motor 34 is controlled by an electronic amplifier 45 across whose output terminals the winding is connected by conductors 46 and 47. The amplifier is powered from another secondary winding 48 upon the transformer 40 to which the amplifier is connected by conductors 49 and 50.

The amplifier 45 is provided with input terminals 51 and 52 and operates to supply the motor field winding 36 with an alternating current potential the phase of which depends upon the phase of an alternating signal potential impressed across said input terminals 51 and 52. Any suitable type of amplifier may be used at this point, and for example attention is invited to the patent to Beers, 2,020,275. Another amplifier suitable for use in my apparatus is that shown in Figure 1 of the co-pending application of Albert P. Upton, Serial No. 437,561, filed April 3, 1942, now Patent No. 2,423,534.

It will be evident that if the motor field winding 36 is supplied with an alternating current potential which leads the current in the other field winding 39 by ninety electrical degrees the motor will rotate in one direction, whereas if the current in field winding 36 lags the current in winding 37 the direction of rotation will be reversed.

The phase of the alternating signal potential impressed across the amplifier input terminals 51 and 52 is determined by the instantaneous electrical conditions existing in a compound network which consists of three electrical networks connected in series. The circuit across the amplifier input terminal may be traced through a conductor 53, a first electrical network indicated generally at 54, conductor 55, a second electrical network 56, a conductor 57, a third electrical network 58, and through a conductor 59 back to the input terminal 52.

The network 53 comprises a transformer having a secondary winding 60 across the terminals of which is connected a slide wire resistance 61 by means of conductors 62 and 63. The transformer also has a primary winding 60ª. Cooperating with the resistance 61 is a slider 64 which is positioned along the resistance by a control knob 65 and this slider and resistance form a control point adjuster, indicated generally at 66.

Another slide wire resistance 67 is connected across the lower half of the transformer secondary winding 60 by a conductor 68 connected to the lower terminal of the winding and a conductor 69 connected to a center tap on the winding. A slider 70 cooperates with the resistance 67 to form a calibrating potentiometer, which is indicated generally at 71. The center tap of the winding 60 is connected by a conductor 72 to the center of the resistance 61 so that the voltage distribution along resistor 61 is less affected by variations in current flow through it as a result of movement of slider 64.

The network 56 comprises a transformer having a secondary winding 73 and a primary winding 73ª. A slide wire resistance 74 is connected across the terminals of the secondary winding 72 by means of conductors 75 and 76. Movable across the resistance 74 is a slider 77 which cooperates with that resistance to form a main pressure controller designated generally at 78. The aforesaid conductor 57 connects the sliders 70 and 77. The controller 78 is adjusted in accordance with the air pressure in the induction system of the engine 10, and for this purpose there is provided a pressure sensing duct 79 which is connected at any suitable point between the supercharging compressor 12 and the carburetor 17. This duct 79 conveys the air pressure to the interior of a bellows 80. A second bellows 81 is provided and the two are supported with their free ends extending toward each other at opposite sides of the slider 77. These ends of the bellows are connected by a link 82 to the slider so that the expansion and contraction of the bellows 80 in response to variations in the engine induction system air pressure will move the slider 77 along the resistance 74. The bellows 81 is evacuated and acts to compensate the control for changes in ambient or atmospheric pressures in a well known manner. By reason of being evacuated, bellows 81 is unaffected by changes in temperature.

The network 54 comprises a transformer having a secondary winding 83 and a primary winding 83ª. A slide-wire resistance 84 is connected by a conductor 85 to the left hand terminal of the field winding 83, and by a conductor 86 to an intermediate tap on the winding. A slider 87 cooperates with the resistance 84 to form an overspeed controller indicated generally at 88. It is in connection with the operation of this controller 88 that my present invention is concerned, and the manner in which the controller is operated will hereinafter be pointed out in detail. It is sufficient at this point for the understanding of the system of Figure 1 as a whole to state that the slider 87 is operated to the left along the resistance 84 upon the approach of the turbine 27 and compressor 12 toward a maximum safe operating speed.

The network 54 also includes a slide wire resistance 89, the left hand terminal of which is connected by a conductor 90 to the aforesaid tap on the field winding 83 and the right hand terminal of which is connected by conductor 91 to the right hand terminal of the winding. Cooperating with the resistance 89 is a slider 92 which is positioned along the resistance by a connection to the aforesaid gear train 35 in such manner that the movement of the slider is concomitant with that of the waste gate 29. The slider 92 and resistance 89 together form a follow-up potentiometer, designated generally at 93. The aforesaid conductor 55 is connected to one terminal of the secondary field winding 73 and to the slider 87, while the conductor 53 is connected, as clearly shown, to the slider 92.

*Operation of Figure 1*

All of the various network transformer primary windings 60a, 73a, and 83a are connected to the same source of alternating current potential as is the primary winding 41 of transformer 40. Therefore, the alternating potentials at the respective terminals of the secondary windings of these transformers are at all times in the same phase relationship with each other. It thus follows that the signal potential impressed across the input terminals 51 and 52 of the amplifier 45 will be the algebraic sum of the number of potentials developed in the respective networks 54, 56 and 58.

For convenience in description, the potential conditions existing during a half cycle in which the transformer secondary windings have the polarity indicated by the legends in the drawing will only be considered. For a reference potential the conductor 59 and amplifier input terminal 52 are indicated as grounded or at zero potential to ground, as shown at 94.

In the network 58 then, the slider 64 in the position shown is positive with respect to the center tap of the transformer secondary winding 60, while the slider 70 being at a mid-point along the resistance 67 is at a negative position with respect to that center tap. This network is thus seen to introduce into the series circuit connected to the amplifier input terminals a potential of such polarity that the slider 70 and conductor 57 are negative with respect to the grounded conductor 59. In the network 56, with the slider 77 in the position shown, the network is seen to introduce into the said series circuit a potential equal to the potential of the slider 77 with respect to the left hand end of the secondary winding 73. Obviously the potential of the conductor 55 with respect to slider 77 is thus positive and for convenience this potential may be considered to be of such magnitude that the conductor 55 is positive with respect to grounded conductor 59. Turning finally to the network 54, it will be apparent that with the slider 87 at the right hand extremity of the resistance 84, the tap on the secondary winding 83 will be at the same positive potential with respect to ground as the conductor 55 leading to this network. The resistance 89 being connected between this point on the transformer secondary winding and the now negative terminal of that winding, the slider 92 will thus be negative with respect to the conductor 55 by a magnitude depending upon the position of the slider and the resulting value of the resistance between the slider and the conductor 91. Thus the network 54 may here be said to introduce into the series circuit a negative potential, and under a condition of balance the magnitude of the negative potential will be equal to and will cancel out the positive potential produced by the algebraic sum of the effects of the networks 56 and 58.

Under such conditions, the amplifier input terminal 51 is at the same ground potential as the terminal 52, there is no signal potential effective upon the amplifier, and the amplifier supplies no current to the motor field winding 36. The waste gate 29 then remains stationary. However, should any of the sliders be shifted from their positions at which the compound network is balanced, a signal potential will develop across the amplifier input terminals resulting in the supply of an operating current to the motor field winding 36 such as to cause the motor 34 to rotate and change the position of the waste gate.

For example, consider the result of a rise in pressure in the engine induction system. The bellows 80 is then expanded and the slider 77 is moved to the left along the resistance 74, reducing the magnitude of the positive potential introduced by the network 56 into the series circuit. This positive potential is thus made insufficient to completely cancel or oppose the sum of the negative potentials introduced by the networks 58 and 54 and a signal potential appears at the amplifier input terminal 51 such that this terminal is negative with respect to terminal 52. It is assumed that the amplifier and motor are properly connected to respond to a signal of this polarity or phase so that the amplifier supplies motor field winding 36 with an alternating current potential of the proper phase relation to cause the motor to rotate in proper direction to move the waste gate 29 toward open position. At the same time, the slider 92 is moved toward the left along the resistance 89.

The opening movement of the waste gate 29 reduces the pressure of the exhaust gases exerted on the turbine 27, causes the speed thereof to decrease, and reduces the compression ratio of the compressor 12. The pressure of the air supplied to the engine 10, and to bellows 80, is now reduced and the slider 77 begins to work back to the right along resistance 74. The movement of the slider 92 to the left along resistance 89, coincident with the opening movement of the waste gate 29, introduces a balancing positive potential into the series network and this movement will continue until this balancing potential is exactly equaled by the potential introduced by operation of the controller 78 and the series network is again balanced. The motor 34 then stops, leaving the waste gate in the newly selected position.

In similar manner a decrease in discharge pressure of the supercharger 12 will introduce an opposite potential by action of the controller 78, causing a signal of opposite phase to be applied to the amplifier which then runs the motor in the opposite direction to close the waste gate and boost the pressure. Such operation is accompanied by a rebalancing movement of the slider 92 to bring the network to balance again.

The same actions occur upon the movement of any of the other sliders 64, 70, or 87 and it will be evident without further description herein that, when properly functioning and energized, the system will permit the selection of any desired discharge pressure for the supercharger under control of controller 66 and will maintain such pressure by means of controller 78.

Attention is particularly directed to the operation of the overspeed controller 88. This controller operates in such manner that when the speed of the turbine 27 and compressor 12 approach a predetermined safe continuous maximum operating value the speed responsive controller unit operates to adjust the slider 87 away from its normal position, as shown in Figure 1, and to the left along the resistance 84. Such movement of the slider 87 disturbs the balance of the compound network and causes the development therein of signal potential such as to cause opening movement of the waste gate 29 thus to reduce the speed of the turbine and compressor. The exact means by which the controller 88 is thus operated will now be described.

Figure 4:
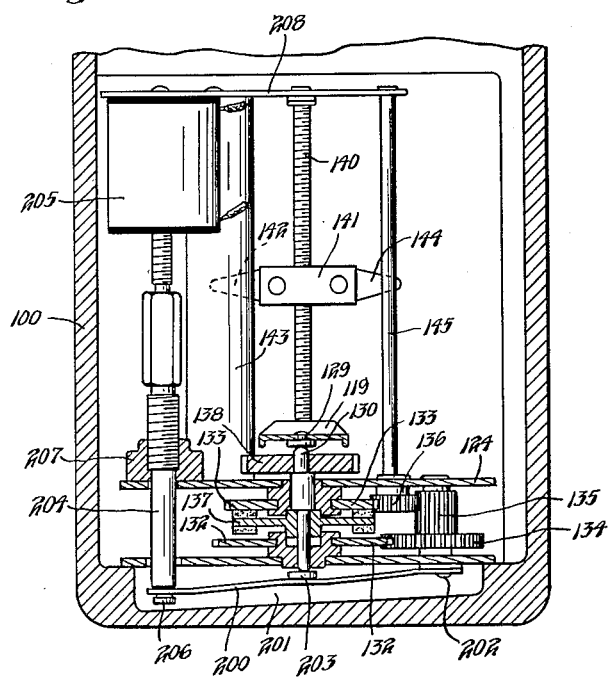
Figure 4 is a vertical sectional view taken substantially along the line 4—4 in Figure 3.

*Figures 2 to 4—Overspeed controller*

I have herein shown a speed responsive control unit which of itself is similar to that disclosed in aforesaid Patent No. 2,388,350 of Daniel G. Taylor, issued November 6, 1945. The construction and operation of this control unit will first be described.

The unit comprises a housing, designated generally at 100, having a base 101 in which there is an opening 102 exposing the lower end of a shaft 103 which is journaled vertically in the housing. Said lower end of the shaft 103 is keyed or splined for making an operating connection with the shaft 30 of the turbine 27 so that the shaft is operated by the turbine. A plate 104 is secured to the shaft 103 by means of a bushing 105 and the plate is provided at diametrically opposed points with pairs of depending ears 106 upon each pair of which a governor weight 107 is pivotally supported. Extensions 108 of the governor weights 107 extend toward the shaft and operate after the fashion of bell crank levers as the weights 107 are swung inward or outward by variations in the angular velocity of shaft 103. Said extensions 108 of the governor weights engage the upper end of a spring housing 109 which is slidable axially upon the shaft 103 and carried within the housing is a governor load spring 110 bearing at its upper end against the housing and urging the same in an upward direction. The lower end of the spring 110 is braced against a nut 111 screwed upon the lower end of the bushing 105 and one side of the bushing is flattened, as indicated at 112. A washer 113 is also placed between the nut 111 and the spring 110 and the aperture in the washer is shaped to fit the flattened side 112 of the bushing so that the washer is non-rotatable thereon. The washer then is provided with a down-struck lug 114 which engages one of the flats of the nut 111 to prevent the same from turning on the bushing 105. When it is desired to vary the tension of the governor load spring 110, the washer 113 may be forced upwardly freeing the lug 114 from the nut 111 so that the latter may be rotated upon the bushing 105. After the nut has been adjusted to the desired position, the washer 113 is released and again seats itself in locking engagement with the nut.

A plate 115 is secured to the lower end of the spring housing 109 and bears against a sleeve 116 which nests within a cup-shaped bearing member 117. The sleeve 116 is preferably made of Bakelite or other suitable wear-resisting material, and may of course rotate freely within the cup-shaped member 117. Said cup-shaped member 117 is pivotally supported by trunnions 118, as seen in Figure 3, upon a lever 119 which is pivoted on a shaft 120 which is journaled in a pair of ears 121 bent upwardly from the opposite sides of a generally flat spring member 122. The other end of the spring member 122 is riveted at 123 to a plate 124 rigidly supported within the casing 109 in spaced relation to the base 101 thereof. A screw 125 is adjustable upwardly and downwardly through a nut 126 supported upon a base plate 127 and the screw upwardly engages the under- surface of the spring member 122, which is self-biased in a downward direction. By adjusting the screw 125 from the outside of the case, through an opening 128 provided for this purpose, it will be apparent that the spring member 122 may be moved upwardly or downwardly to correspondingly position the fulcrum point 120 for the lever 119. This screw adjustment thus provides for fine control over the speed of the shaft 103 at which the governor weights 107 will become effective to swing the lever 119 downwardly about said fulcrum point, as will presently appear.

The lever 119 extends from its pivot point 120 across the casing and beyond the shaft 103 and carries a button 129 which downwardly engages a clutch shaft 130 supported parallel with the shaft 103 and biased in an upwardly direction by means which will be presently described.

A portion of the shaft 103 is splined or provided with gear teeth 131 and a gear 132 journaled freely upon the clutch shaft 130 meshes with these gear teeth. A second gear 133 also rotatably mounted upon the clutch shaft 130 and spaced above the gear 132 is adapted to be rotated in the direction opposite to that at which the gear 132 is rotated by the shaft 103 and at a slower speed. For this purpose, as best seen in Figures 3 and 4, the gear 132 meshes with a gear 134 which has a pinion 135 meshing with an intermediate or idling gear 136 which in turn meshes with the aforesaid gear 133. Thus both of the gears 132 and 133 are rotated by the shaft 103 but in opposite directions and at differing speeds. The clutch shaft also carries a double faced clutch designated at 137 which is fixed upon the clutch shaft to rotate therewith and is positioned between the gears 132 and 133. Near its upper end above the mounting plate 124 the clutch shaft 130 carries a fixedly mounted drive gear 138 which meshes with a gear 139 fixed upon the lower end of an upright threaded shaft 140.

An internally threaded nut 141 rides the shaft 140 and is moved upwardly and downwardly thereon by rotation of the shaft through the gears 138 and 139. A nut 141 carries a slider 142 which engages the surface of a slidewire resistance 143 disposed in an upright position along the shaft 140. An opposite extension of the slider engages a collector rod 145 also supported in upright position parallel with the shaft 140 and on the side thereof opposite the resistance 143. The slider 142 and resistance 143 constitute the overspeed controller 88 of Figure 1 and correspond to the slider 87 and resistance 84 shown schematically therein. A notched extension 146 of the lever 119 lies in the path of the nut 141 at the lower end of its range of movement.

*Operation of the overspeed controller*

As long as the angular velocity of the shaft 103 remains below the predetermined maximum value determined by the loading on the governor weights 107 the clutch shaft 130 will be biased upwardly so that the clutch 137 engages the upper gear 133 and thus connects that gear to the clutch shaft. Under these conditions the clutch shaft is rotated in a direction so that the threaded shaft 140 rotates to carry the nut 141 downwardly. If the speed of the shaft 103 remains below said predetermined maximum value for a sufficiently long time the nut 141 will finally reach the lower end of its range of movement and by contact with the notched end 146 will urge the lever 119 in a downward direction.

This action of the lever 119 causes the button 129 to urge the clutch shaft 130 in a downward direction carrying the clutch 137 out of engagement with the gear 133 so that the drive is disconnected from the clutch shaft. Thereupon the clutch shaft is no longer rotated and the nut 141 remains in this position so that the slider stands at the lower end of the resistance 143. This corresponds to the position of the slider 87 in Figure 1.

If the angular velocity of the shaft 103 now rises beyond the value determined by the loading of the governor weights the centrifugal force operating on these weights causes them to swing outwardly, moving the extensions 108 in a downward direction. The spring housing 109 is thus forced downwardly and this action is transmitted through the bearing member 117 to the lever 119, causing the free end of the lever carrying the button 129 to also move in a downward direction. This movement of the lever, by overcoming the upward bias upon the clutch shaft 130, moves the same downwardly causing the clutch 137 to now engage the lower gear 132. The continuous rotation of this gear 132 is now transmitted directly to the clutch shaft 130 causing the gears 138 and 139 to now rotate the shaft 140 in an opposite direction and carry the nut 141 upwardly. The slider 142 is now carried up along the resistance 143, which corresponds to a movement of the slider 87 to the left along the resistance 84 in Figure 1 to cause the introduction of a signal potential in the amplifier 45 such as to cause the speed of the turbine 27 to be reduced. Thus it is apparent that as soon as the velocity of the shaft 103, which is driven by the turbine, exceeds the predetermined maximum value at which the turbo-supercharger may safely continuously operate, the speed responsive action of the governor mechanism will initiate the introduction of a corrective signal to reduce the operating speed. The amount of this corrective signal will, moreover, be dependent upon the length of time the speed exceeds the maximum value.

*Reset or override for the overspeed controller*

As here shown, the clutch shaft 130 is biased in an upward direction by a flat spring 200 which is positioned in a cavity 201 in the housing base 101 below the shaft and it is anchored at one end 202 to the base plate 127. This spring 200 extends from its anchored end beyond the clutch shaft and it is provided with a button 203 which upwardly engages the exposed lower end of the shaft. The spring 200 is further self-biased in an upward direction to correspondingly move the shaft as required to normally cause it to engage the button 129 upon the lever 119.

It will be apparent that the spring load against which the governor mechanism must operate is in part supplied by the spring 200 since the lever 119 must overcome the upward tension of the spring upon the clutch shaft 130 in order to move the same downwardly and initiate the upward, speed reducing movement of the nut 141 and wiper 142. I take advantage of this fact by connecting to the free end of the spring 200 the lower end of a plunger or rod 204 which is vertically movable in the casing 100 and extends at an upper end into a solenoid 205. Normally the plunger 204 assumes the position shown in Figure 4, at which its grooved end 206 substantially clears the end of the spring 200 and has no influence upon the tension thereof effective upwardly upon the clutch shaft 130. This is the normal position of the plunger and a nut 207 threaded thereon acts as a stop by downwardly contacting the mounting plate 124 to adjustably set this lower position of the plunger. Upon energization of the solenoid 205, however, the plunger 204 will be attracted by the magnetic field set up thereby and will be moved in an upward direction. The solenoid 205 is shown as conveniently mounted upon an upper mounting plate 208 which may also support the upper ends of the resistance 143, the shaft 140 and the collector rod 145, but the specific mechanical arrangement in this respect is immaterial to my invention.

*Operation*

As best seen in Figure 1, the solenoid 205 is indicated diagrammatically as connected by conductors 209 and 210 to a manually and remotely controllable switch 211 and a battery 212 or other source of operating potential. When it is desired to override or reset the overspeed controller, the switch 211 may be closed to energize the solenoid 205, causing it to attract the plunger 204 and urge the same in an upward direction. The spring 200 is flexed by this action in such manner as to bring to bear an added upward tension upon the clutch shaft 130 so that in order for the lever 119 to force the clutch shaft downward and so bring the clutch 137 into driving engagement with the gear 132 there will be required more than normal force to be exerted upon the lever by the governor weights 107. Thus, this action upon the clutch shaft 130, which is necessary to initiate the movement of the wiper 142 to bring about a decrease in speed, will occur at a higher maximum speed of the shaft 103 and the turbine 127 driving the same due to the added load against which the governor must operate. I thus provide means whereby the maximum speed may be exceeded for short periods of time whenever required, and without in any way interfering with the normal operation of the overspeed controller when emergency or "war" power is not required.

Pertinent parts of the overspeed controller, the lever 119, and clutch shaft 130, as well as the plunger 204 and the spring 200 are indicated by corresponding reference characters in Figure 1 of the drawing and it is thought that the operation of the apparatus will be understood without further description herein.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for controlling a variable speed device, comprising in combination, an overspeed controller, a governor responsive to the speed of the device, a clutch connected between the governor and said controller and operative upon an increase in speed of said device toward a normal maximum value to cause the governor to operate said controller in a speed reducing direction, spring means normally resisting such operation of the clutch by the governor, and electrical bias means directly cooperating with said spring means for temporarily increasing the force thereof effective upon the clutch and governor whereby a greater than normal speed of the device may be obtained before said governor becomes effective on the controller to limit the speed.

2. Apparatus for controlling a variable speed device, comprising in combination, an overspeed controller, a governor responsive to the speed of the device, a clutch connected between the governor and said controller and operative upon an increase in speed of said device toward a normal maximum value to cause the governor to operate said controller in a speed reducing direction, spring means normally resisting such operation of the clutch by the governor, and a solenoid operative when energized upon said spring means to increase the force thereof effective on the clutch and governor and operative to raise the maximum speed range at which said governor becomes effective upon the controller.

3. Apparatus for controlling a variable speed device, comprising in combination, an overspeed controller, a governor responsive to the speed of the device, a power actuated reversible gear train connected to said controller, a clutch operated by the governor and operative in a normal position to connect the gear train to the controller to operate the same to a normal position, said clutch being operative by the governor to another position to reverse the operation of the gear train upon the controller and to operate the same in a direction for reducing the speed of the device, a spring normally urging the clutch toward said normal position and resisting the action of the governor upon the clutch, and electrical biasing means for temporarily increasing the force of said spring upon the clutch to thereby increase the speed of the device at which said governor will become effective to operate the clutch to the position at which it operates the controller to reduce the speed.

4. Apparatus for controlling a variable speed device, comprising in combination, an overspeed controller, a governor responsive to the speed of the device, a power actuated reversible gear train connected to said controller, a clutch operated by the governor and operative in a normal position to connect the gear train to the controller to operate the same to a normal position, said clutch being operative by the governor to another position to reverse the operation of the gear train upon the controller and to operate the same in a direction for reducing the speed of the device, a spring normally urging the clutch toward said normal position and resisting the action of the governor upon the clutch, and a solenoid operatively connected to the spring to temporarily increase the tension thereof upon the clutch and establish a higher speed range at which the governor will become effective upon the clutch.

5. An overspeed controller comprising, centrifugal speed responsive means, an input shaft connected to drive said responsive means, an output shaft which is operative when an overspeed condition exists, clutch means connected between said input shaft and said output shaft and controlled by said responsive means, resilient biasing means maintaining said clutch ineffective until a predetermined input shaft speed is reached, and an electromagnetic actuator connected to said biasing means to vary the biasing action thereof.

HUBERT T. SPARROW.

REFERENCES CITED

The following references are of record in the file of this patent:

UNITED STATES PATENTS

| Number | Name | Date |
|---|---|---|
| 2,299,635 | MacNeil et al. | Oct. 20, 1942 |
| 2,376,142 | Hoffman et al. | May 15, 1945 |
| 2,388,350 | Taylor | Nov. 6, 1945 |
| 2,421,496 | Grieshaber et al. | June 3, 1947 |
| 2,423,417 | Stokes et al. | July 1, 1947 |